United States Patent [19]

Jones

[11] 4,059,053

[45] Nov. 22, 1977

[54] DRIVERLESS VEHICLE TRAFFIC CONTROL SYSTEM

[75] Inventor: Vercoe C. Jones, Easton, Pa.

[73] Assignee: S I Handling Systems, Inc., Easton, Pa.

[21] Appl. No.: 608,132

[22] Filed: Aug. 27, 1975

[51] Int. Cl.$^2$ .................. B60S 13/00; B61B 13/00
[52] U.S. Cl. ............................ 104/35; 104/166; 104/252
[58] Field of Search .............. 104/36, 35, 38, 48, 104/99, 166, 249, 252, 250, 253

[56] References Cited

U.S. PATENT DOCUMENTS

| 988,520 | 4/1911 | Strauss | 104/252 |
|---|---|---|---|
| 1,100,184 | 6/1914 | Housman et al. | 104/252 |
| 1,337,944 | 4/1920 | Nolan | 104/252 |
| 1,616,368 | 2/1927 | Harmon | 104/252 |
| 2,593,215 | 4/1952 | Summerhays | 104/47 |
| 3,742,860 | 7/1973 | Fahringer | 104/88 |
| 3,858,626 | 1/1975 | Ribordy | 104/166 |
| 3,898,935 | 8/1975 | Nolie et al. | 104/37 |
| 3,903,810 | 9/1975 | Jones | 104/166 |

Primary Examiner—Robert J. Spar
Assistant Examiner—Carl Rowold
Attorney, Agent, or Firm—Seidel, Gonda & Goldhammer

[57] ABSTRACT

A transfer table is movable to place tracks thereon into and out of alignment with stationary tracks. When a driverless wheeled vehicle is on the tracks of the transfer table, and the transfer table tracks are out of alignment with the stationary tracks, a device automatically stops vehicles adjacent the free ends of the stationary tracks. A discrete rotatable drive shaft is provided between the stationary tracks and between the tracks of the transfer table for causing a driverless vehicle to move therealong.

15 Claims, 5 Drawing Figures

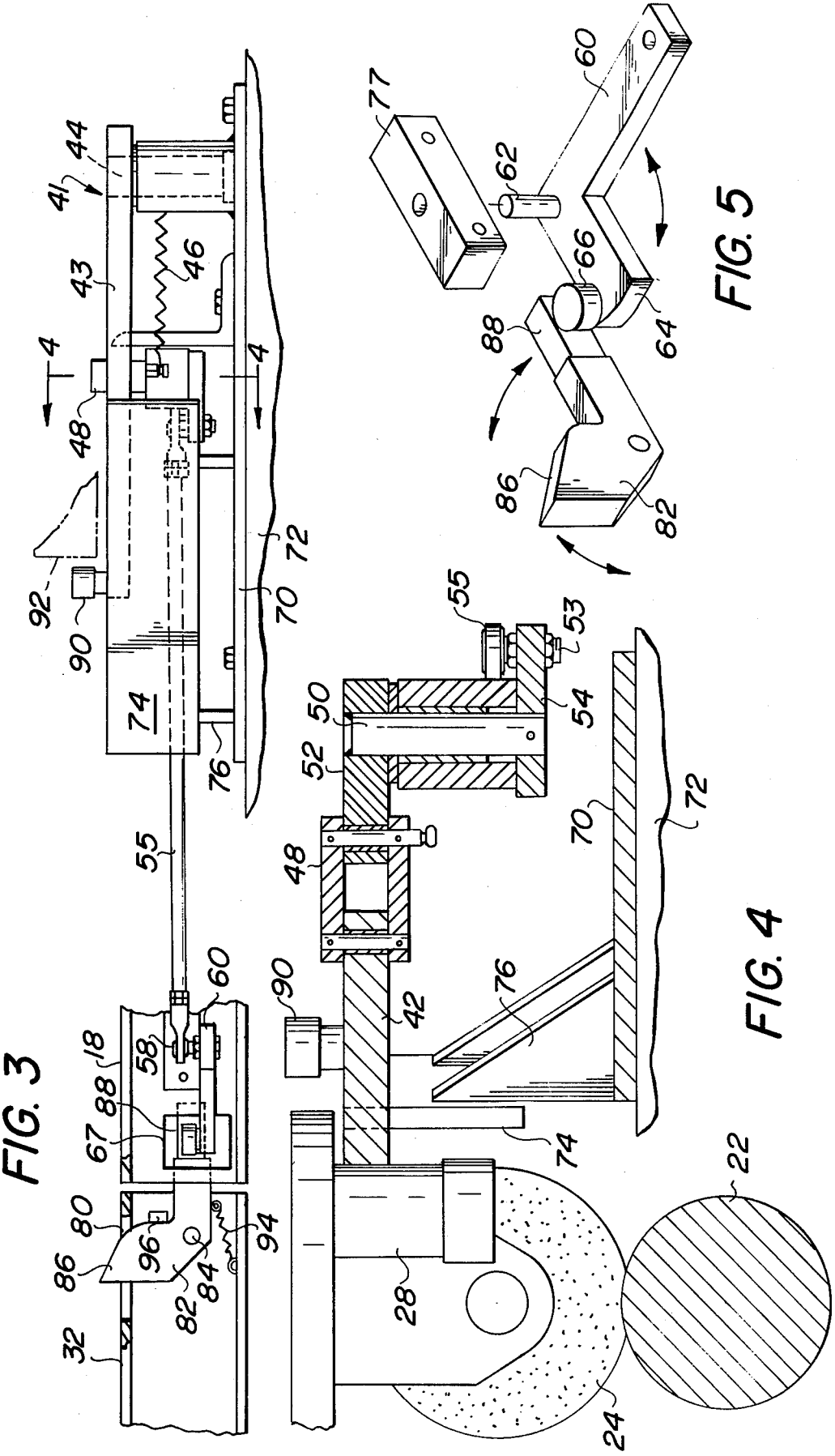

DRIVERLESS VEHICLE TRAFFIC CONTROL SYSTEM

BACKGROUND

This invention relates to driverless wheeled vehicles of the type classified in class 104. As a disclosure exemplifying the type of system involved herein, see U.S. Pat. No. 3,356,040; U.S. Pat. No. 3,818,837; and U.S. Pat. No. 3,903,810.

There is a need for a control system which permits only one driverless vehicle at a time to be driven off the free ends of stationary tracks onto a transfer table only when the transfer table is in a receiving position and to restrain any following vehicles until the transfer table moves away and returns to the receiving position.

This invention is directed to a driverless vehicle traffic control system comprising stationary first and second tracks having free ends, a transfer table having third and fourth tracks thereon, said transfer table being movable from a receiving position wherein each track on said transfer table is aligned with one of said stationary tracks to a nonreceiving position wherein the tracks on said transfer table are misaligned with the stationary tracks.

A vehicle stopping means is provided adjacent the free ends of the stationary tracks for preventing driverless vehicles from passing beyond the free ends except when the transfer table is in its receiving position. The vehicle stopping means includes a cam for contacting a movable portion of a driverless vehicle to cause the vehicle to halt while on said stationary tracks. A cam release means is provided for releasing said cam when the transfer table is in a receiving position.

It is an object of the present invention to provide a novel driverless vehicle traffic control system whereby a driverless vehicle can transfer from stationary tracks onto a transfer table only when the transfer table is in a receiving position.

It is another object of the present invention to provide a driverless vehicle traffic system for causing a vehicle to automatically stop and then continue movement in response to the relative position of a transfer table with respect to tracks which guide the movement of the vehicle.

It is another object of the present invention to provide a driverless vehicle traffic control system which requires a transfer table which receives a vehicle, moves away from its vehicle receiving position to discharge a vehicle, and returns to its receiving position before permitting another vehicle to pass beyond the ends of stationary tracks.

It is another object of the present invention to provide a traffic control system for driverless vehicles which is simple, reliable, automatic, and requires little or no maintenance.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 1.

FIG. 4 is a sectional view, on an enlarged scale, taken along the line 4—4 in FIG. 3.

FIG. 5 is a perspective view of components shown in FIG. 3 but on an enlarged scale.

Referring to the drawing in detail, wherein like numerals indicate like elements, there is shown in FIG. 1 a system in accordance with the present invention.

A driverless vehicle designated generally as 12, and of the type disclosed in the above mentioned patents and pending application, is provided with wheels 14 and 16 which ride on stationary tracks 18 and 20, respectively.

Figure 1:
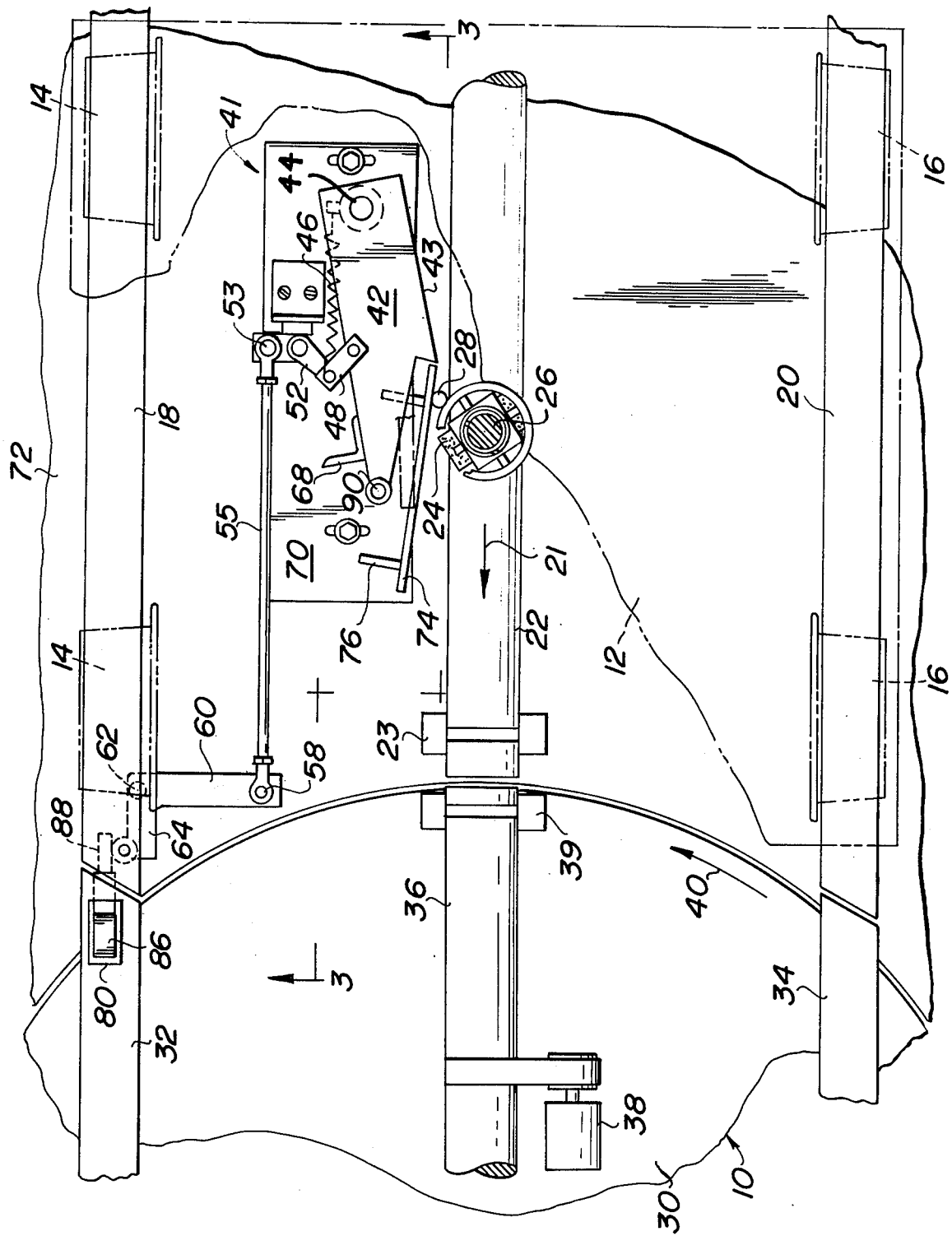
FIG. 1 is a plan view of a portion of the system in accordance with the present invention wherein a transfer table is in its receiving position.

In FIG. 1, the vehicle 12 is driven in the direction of arrow 21 by means of a drive shaft 22. Drive shaft 22 is rotatably driven for rotation about its longitudinal axis by means of a motor not shown. The drive shaft 22 is provided at one end with a bearing 23. The rotary movement of the drive shaft 22 is converted to cause the vehicle 12 to move in the direction of arrow 21 by contact between said drive shaft and a drive wheel 24.

Drive wheel 24 rotates about a horizontal axis. When the axis of rotation of wheel 24 is parallel to the axis of drive shaft 22, there is no movement of the vehicle 12 in the direction of arrow 21. The wheel 24 is supported on the bottom side of the vehicle 12 by means of a shaft 26 and is biased by a spring to the position shown in FIG. 1 wherein the axis of rotation of the wheel 24 is at an acute angle of 35°–45° with respect to the longitudinal axis of drive shaft 22. A ring connected to shaft 26 is provided with a cam follower 28.

Adjacent the free ends of the tracks 18 and the free end of drive shaft 22, there is provided a transfer table 30. The transfer table 30 is provided with tracks 32 and 34 thereon. When the table 30 is in its vehicle receiving position such as that shown in FIG. 1, track 32 is aligned with track 18 and track 34 is aligned with track 20.

A drive shaft 36 is provided on the table 30. A motor 38 is supported by the table 30 for movement therewith and is driving relation with the drive shaft 36. One free end of the drive shaft 36 is shown supported by a bearing designated 39. In the vehicle receiving position shown in FIG. 1, the drive shafts 22 and 36 are coaxial with their adjacent ends being spaced from each other by a slight gap of about ¼ inch. The table 30 is movable from its vehicle receiving position shown in FIG. 1 to a position wherein a vehicle supported thereby is being transferred. Movement of the table from its vehicle receiving position may be in the form of rotation, pivotable movement, or reciprocation. For purposes of illustration, the table 30 is mounted for rotation in the direction of arrow 40 about a vertical axis.

Figure 2:
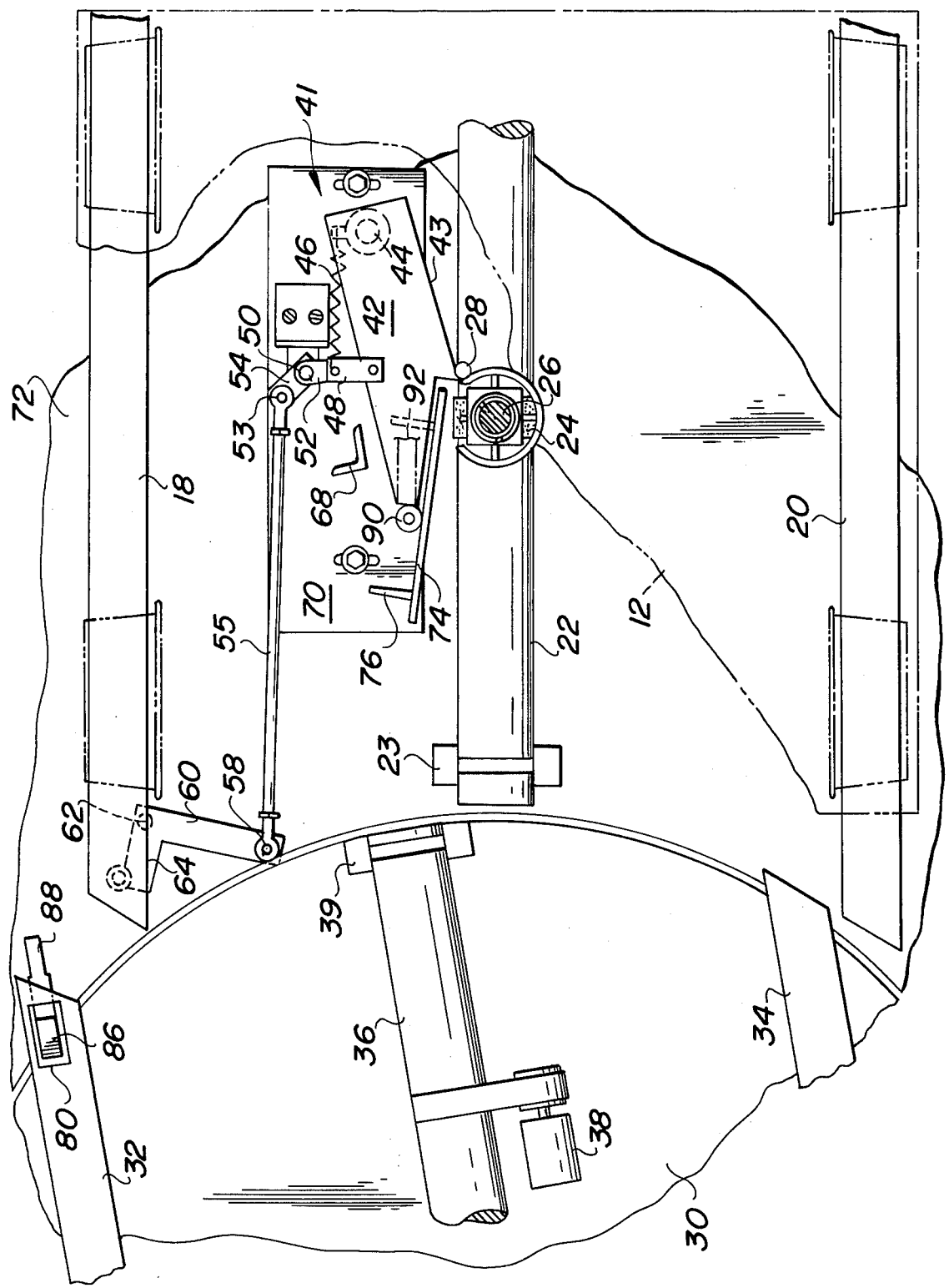
FIG. 2 is a view similar to FIG. 1 but showing the transfer vehicle when it is not in a receiving position.

A vehicle stop means 41 is provided for stopping the vehicle 12 in the approximate location as shown in FIGS. 1 and 2 whenever the table 30 is not in its vehicle receiving position as shown in FIG. 1. The vehicle stopping means 41 includes a cam 42 mounted for pivotable movement about a vertical pin 44. Cam 42 has a cam surface 43 which is disposed at an acute angle with respect to the longitudinal axis of drive shaft 22. A spring 46 extends from a bearing for pin 44 to a link 48 and biases the cam 42 to the position shown in FIG. 2. Link 48 has one end pivotably connected to the cam 42. The other end of link 48 is pivotably connected to one end of a link 52. The other end of link 52 is connected to a rotatable pin 50. Pin 50 is provided with a suitable bearing for rotation about a vertical axis.

The lower end of pin 50 is connected to a link 54. See FIG. 4. Link 54 is pivotably connected to one end of rod 55 by pin 53. Rod 55 is generally parallel to the longitudinal axis of drive shaft 22 when the table 30 is in its receiving position.

A bell crank 60 has one leg thereof pivotably connected to the other end of connecting rod 55 by means of pin 58. The bell crank 60 is pivotably mounted about the axis of vertical pin 62 supported by the track 18. The tracks 18 and 20 are preferably in the shape of a I-beam so as to provide mounting space between the upper and lower flanges thereof. In this regard, note the elevation of the bell crank 60 in FIG. 3.

The other leg of the bell crank 60 is designated 64 and has thereon a follower 66. The web of the track 18 is provided with an opening 67 through which a portion of leg 64 and follower 66 extend when the vehicle transfer table 30 is not in its receiving position. Compare the relative position of the bell crank 60 as shown in FIG. 1 with that shown in FIG. 2.

The vehicle stopping means 41 is preferably preassembled onto a mounting plate 70 whereby the entire means 41 may be installed or replaced as a unit after disconnecting the pins 62. A limit stop 68 is provided on the plate 70 to limit the pivotable movement of the cam 42. An acceleration plate 74 having a vertically disposed surface is provided on the plate 70 by means of brackets 76. The vertical surface of plate 74 forms an acute angle with the longitudinal axis of the drive shaft 22. Thus, it will be noted that the plate 74 and the cam surface 43 converge toward a vertical plane containing the longitudinal axis of drive shaft 22. As shown in FIG. 4, the upper surface of cam 42 and plate 74 are coextensive with the height of plate 74 being substantially greater than the height of cam 42. The relative elevation of drive shaft 22 with the elements of the stop means 41 are shown in FIG. 4.

The bell crank 60 is supported from the web of the track 18 by a mounting block 77. Mounting block 77 has a vertically disposed bore for rotatably supporting the pin 62 and a pair of transverse bores to facilitate bolting the mounting block 77 to the web of track 18 adjacent the opening 67 in the web of track 18.

The means for actuating the vehicle stop means 41 is supported by the turntable 30 for movement therewith. Track 32 is provided with an opening 80 in the top surface thereof on which the wheels 14 of the vehicle 12 ride. The web of track 32 supports an actuator 82 mounted for pivotable movement about the axis of pin 84. One leg of the actuator 82 is in the form of a cam 86 which projects upwardly through the opening 80. Another leg of the actuator 82 is an extension 88 which is generally parallel to the tracks 18, 32 in the receiving position of the table 30. In the receiving position of the table 30, the extension 88 contacts the follower 66 on the bell crank 60 and rotates it whereby the leg 64 is generally parallel to the tracks 18, 32. See FIG. 1. When the table 30 has moved from its receiving position as shown in FIG. 2, the follower 66 and a portion of leg 64 project through the opening 67 in the web of track 18. See FIG. 2.

A safety limit stop 90 is provided on the cam 42 and projects upwardly therefrom. See FIG. 3. A depending bracket 92 on the bottom of the vehicle 12 contacts the limit stop 90 when the cam 42 is in its stop position as shown in FIG. 2 and the follower 28 has reached the end of the cam surface 43.

The system 10 operates as follows.

When the turntable 30 is in its vehicle receiving position as shown in FIG. 1, the extension 88 rotates the bell crank 60 to the position shown in FIG. 1 whereby cam 42 is rotated in a clockwise direction in FIG. 1 due to the angular disposition of the links 48 and 52. The spring 46 is stretched by the links 48, 52. When vehicle 12 approaches the position of cam 42, contact between follower 28 and cam surface 43 results in the cam 42 being pivoted in a clockwise direction in FIG. 1 whereby the vehicle 12 may pass beyond the same and transfer from the tracks 18, 20 to the track 32, 34 respectively.

When the wheel 14 on the front end of the vehicle 12 transfers onto the track 32, it depresses the cam 86 of the actuator 82. Depressing the cam 86 rotates the actuator 82 in a counterclockwise direction in FIG. 3 thereby causing the extension 88 to move in such counterclockwise direction to a position above the elevation of the follower 66. Cam 86 is depressed until it is flush with the upper surface of track 32. Rotation of the actuator 82 in a counterclockwise direction in FIG. 3 stretches spring 94.

When the extension 88 has been pivoted upwardly to a position wherein it no longer contacts the follower 66, spring 46 contracts thereby pivoting links 48, 52 and bell crank from the position shown in FIG. 1 to the position shown in FIG. 2. When this occurs, the follower 28 on the vehicle 12 is downstream from the cam surface 43. Hence, the vehicle stop means 41 assumes the position shown in FIG. 1 for stopping all subsequent vehicles until the cam 42 is again released by contact between extension 88 and follower 66.

As soon as the wheel 14 at the front end of the vehicle 12 passes over the cam 86, it is returned by rotating in a clockwise direction in FIG. 3 by spring 94. However, the extension 88 is now above the elevation of the follower 66 and therefore is incapable of pushing the follower 66 horizontally to cause the bell crank 60 to rotate from the position shown in FIG. 2 to the position shown in FIG. 1.

After the vehicle 12 has transferred onto the table 30, the vehicle trips a switch which causes the table 30 to move from its receiving position shown in FIG. 1. Such movement of the table may be rotation about a vertical axis, pivoting about a vertical axis, or reciprocation in a horizontal direction for transferring the vehicle 12 to another set of tracks. This rotation has moved extension 88 out of interference with follower 66, permitting spring 94 to return follower 88 to its normal elevation in line with follower 66.

When the table 30 returns to the position shown in FIG. 1, the extension 88 is now at the same elevation as the follower 66. In this regard, the track 32 may be provided with a limit stop 96 to assure that the extension 88 is at the proper elevation with the cam 86 projecting upwardly through the opening 80. As the table 30 moves to the receiving position wherein the respective tracks and drive shafts are properly aligned, extension 88 contacts follower 66 and pivots the same from the position shown in FIG. 2 to the position shown in FIG. 1 thereby releasing the cam 42.

While the table 30 has a vehicle thereon which is being transferred, all subsequent vehicles moving along the tracks 18, 20 are stopped by the vehicle stop means 41. As a vehicle approaches the vehicle stop means 41, the follower 28 thereon contacts the cam surface 43 to cause rotation of the drive wheel 24 until the axis of rotation of wheel 24 is approximately parallel to the axis of rotation of the drive shaft 22. When this occurs, the vehicle stops moving along the length of the tracks 18, 20 and the follower 28 is still in contact with the surface 43.

In the event that the follower 28 does not cam to a position by surface 43 that will stop the car, the bracket 92 on the lower surface of the vehicle will contact the limit stop 90 and prevent any further movement of the vehicle.

If a vehicle is stopped by the stop means 41 when cam 42 is released as described above, cam 42 pivots out of the way whereby the follower 28 may rotate in a counterclockwise direction in FIG. 1 at a rate controlled by contact with the side face of acceleration plate 74. In this manner, the vehicle accelerates in a controlled manner and transfers onto the table 30.

The extension 88 may include a rotatable contact member which rotates about a horizontal axis for contact with the follower 66 which rotates about a vertical axis. In this manner, wear on the extension 88 may be minimized. If the table 30 is mounted for horizontal reciprocation instead of rotation in the direction of arrow 40, the extension 88 may be provided with a cam which contacts the follower 66 and pivots the bell crank 60 in the manner described above.

In view of the above description, it will be noted that the vehicle 12 is permitted to pass downstream from the stop means 41 depending upon the position of the table 30. If table 30 is in a position wherein it can receive vehicle 12, the vehicle 12 will slow down slightly at stop means 41 and then increase speed and continued onto the table 30. When the table 30 is not in a vehicle receiving position, all vehicles encountering stop means 41 will be caused to stop and wait for the table 30 to return. Thus, there has been provided a traffic control system which is automatic for use in connection with driverless vehicles.

When the cam 42 is in its vehicle stopping position as shown in FIG. 2, spring 46 has pivoted links 48 and 52 into an aligned position or an over-the-center position so that cam 42 cannot rotate about the axis of pin 44. Other equivalent devices may be used for this purpose. While the system as described and illustrated is preferably a mechanical system, various movements may be caused by use of an electro-mechanical system. For example, element 66 may be the contacts of a relay for controlling a solenoid operated plunger connected to cam 42 to control movement of cam 42. While cam 42 preferably is mounted for pivotable movement, it could reciprocate from an operative to an inoperative position.

The present invention may be embodied in other specific forms without departing from the spirit or essential attributes thereof and, accordingly, reference should be made to the appended claims, rather than to the foregoing specification as indicating the scope of the invention.

I claim:

1. A driverless vehicle traffic control system comprising stationary first and second tracks having free ends, a table having third and fourth tracks, said table being movable from a receiving position adjacent said free ends to a non-receiving position, each track on said table being aligned with one of said stationary tracks when said track is in its receiving position, vehicle stopping means adjacent said free ends of said stationary tracks for preventing vehicles from passing beyond said free ends of said stationary tracks except when said table is in its receiving position, a release means for releasing said vehicle stopping means, a portion of said release means being supported by said table for releasing said vehicle stopping means when the table is in its receiving position, and said portion of said release means supported by said table including an actuator for actuation by a portion of a vehicle during transfer of the vehicle from said stationary tracks onto said table tracks whereby the actuator disengages said release mechanism to re-engage said stopping means.

2. A system in accordance with claim 1 wherein said vehicle stopping means includes a cam for controlling a movable portion of a vehicle to cause the vehicle to halt while on said first and second tracks, a drive shaft between said first and second tracks and being generally parallel thereto, said vehicle stopping means being supported adjacent said drive shaft.

3. A system in accordance with claim 1 wherein said actuator includes an element mounted for movement on one of said table tracks and positioned for actuation by a wheel on a vehicle.

4. A system in accordance with claim 1 wherein said table is mounted for rotation about a vertical axis, said portion of said release means on said table projecting outwardly beyond the periphery of said table, a drive shaft extending longitudinally between said first and second stationary tracks, a drive shaft on said table, said drive shafts being coaxial when said table is in its receiving position, each track on said table being aligned with one of said stationary tracks when said table is in its receiving position.

5. A system in accordance with claim 1 wherein said first track has a vertically disposed web provided with an opening therethrough, at least a portion of said vehicle stopping means being supported by said first track adjacent said opening and at least partially projecting through said opening when said vehicle stopping means is effective to halt the movement of vehicles along said first and second tracks.

6. A system in accordance with claim 1 wherein said vehicle stopping means is arranged to permit only one vehicle to be transferred onto said table until said table has moved from its receiving position and then returns to its receiving position.

7. A system in accordance with claim 6 wherein a portion of said vehicle stopping means is mounted on said table for movement therewith.

8. A system in accordance with claim 1 wherein said stopping means is placed in its vehicle stopping position when said actuator is actuated.

9. A driverless vehicle traffic control system for use with vehicles having a drive wheel rotatable between a driving and a stop position relative to associated drive means comprising stationary first and second tracks having free ends and drive means, a table having third and fourth tracks, said table being movable from a receiving position to a non-receiving position, said third track being aligned with and adjacent to said first track and said fourth track being aligned with and adjacent to said second track when said table is in its receiving position, vehicle stopping means adjacent said free ends of said stationary tracks for preventing vehicles from passing beyond said free ends except when said table is in its receiving position, said vehicle stopping means including a cam for controlling the rotative position of the drive wheel of a vehicle to cause the drivewheel to assume the stop position thereby to halt the vehicle while on said first and second tracks, cam release means for disabling said vehicle stopping means when said table is in its receiving position, a portion of said cam release means being supported by said table for movement therewith, whereby a vehicle moves beyond the free ends of said first and second tracks only when said table is in its receiving position for transfer onto the table.

10. A system in accordance with claim 9 said table includes a horizontally disposed drive shaft for driving said drive wheel supported for rotation about its longitudinal axis, a motor supported by said table for rotating said drive shaft about its longitudinal axis, and said table being mounted for movement about a vertical axis.

11. A system in accordance with claim 9 wherein said first track supports a portion of said cam release means in a position for contact with said cam release means portion on said table when said table is in its receiving position.

12. A system in accordance with claim 9 wherein said portion of said cam release means on said table includes an actuator supported by one of the tracks on said table for actuation by a wheel of a vehicle during transfer of a vehicle from said stationary tracks onto said table tracks.

13. A system in accordance with claim 6 wherein said actuator is biased to a position wherein it projects above said third track and is supported so that it may be depressed by contact with a wheel of a vehicle.

14. Apparatus for use in a driverless vehicle traffic control system comprising a table mounted for movement from a receiving position to a non-receiving position, a pair of tracks on said table for receiving a vehicle, a drive shaft on said table between said tracks, a motor means on said table for rotating said drive shaft about its longitudinal axis, and an actuator for initiating release of a vehicle stop means when said table is in its vehicle receiving position to receive a vehicle on said tracks, said actuator being supported by said table and projecting beyond the periphery of said table, a portion of said actuator being positioned for actuation by a portion of a vehicle passing said actuator portion to move said actuator from its release initiating position thereby to allow said stop means to return to its normally biased stopping position.

15. Apparatus in accordance with claim 14 wherein said actuator is supported by one of said tracks, one of said tracks having an opening through which said actuator projects, said actuator having a cam surface for contact with a wheel rolling along said one track, said actuator being biased to a position wherein said cam surface projects upwardly through said opening, said actuator being supported by said one track in a manner which enables the actuator to move downwardly at least partially through said opening when said cam surface is contacted by a wheel of a vehicle.

* * * * *